(No Model.)
W. F. STIMPSON.
2 Sheets—Sheet 1.
MEANS FOR RAISING AND LOWERING HARVESTER REELS.
No. 476,027.
Patented May 31, 1892.
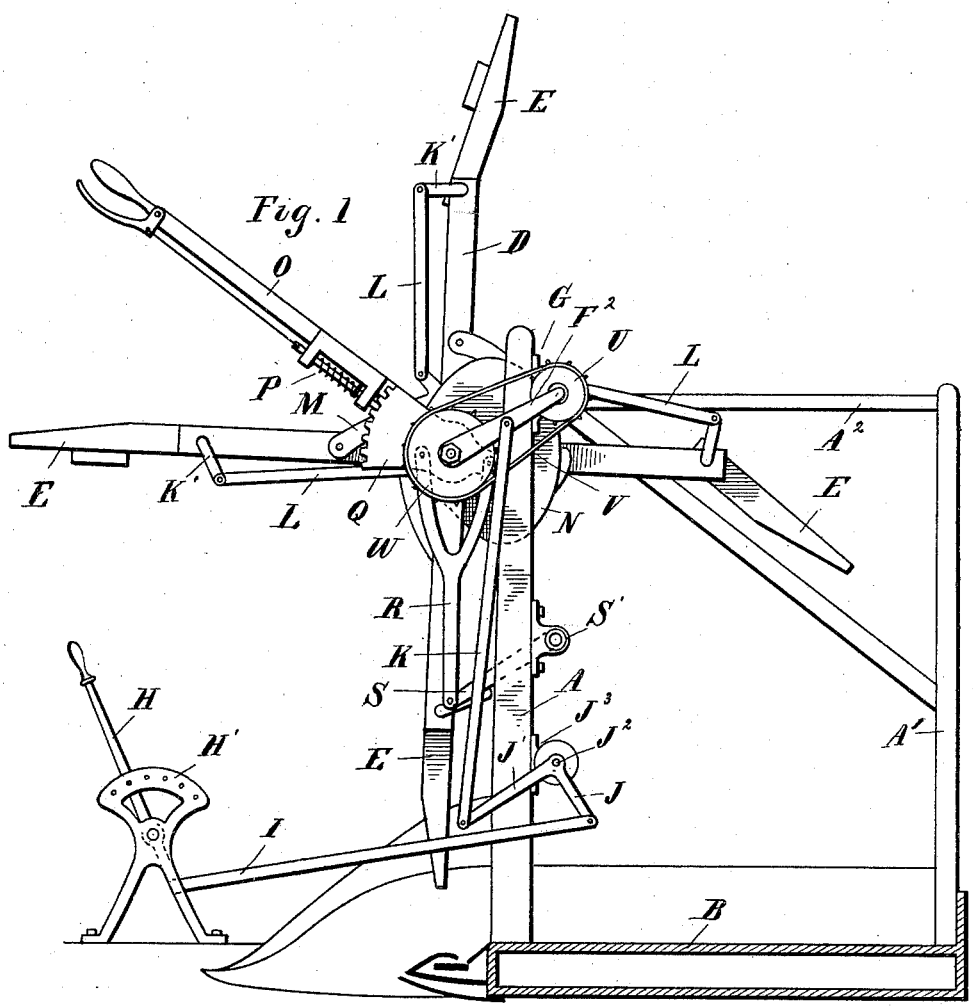
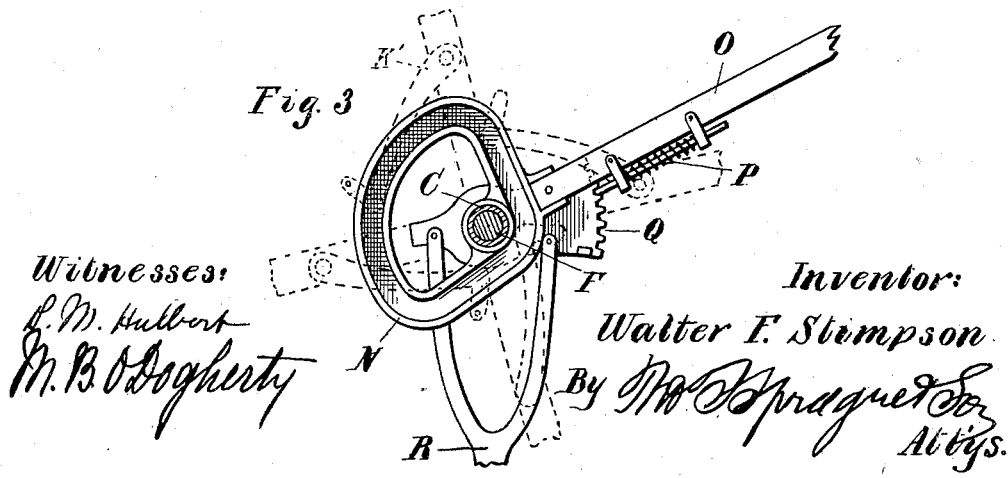
Witnesses:
L. M. Hulbert
M. B. O'Dogherty
Inventor:
Walter F. Stimpson
By Mr. Sprague &Co
Attys.
THE NORRIS PETERS CO., PHOTO-LITHO., WASHINGTON, D. C.

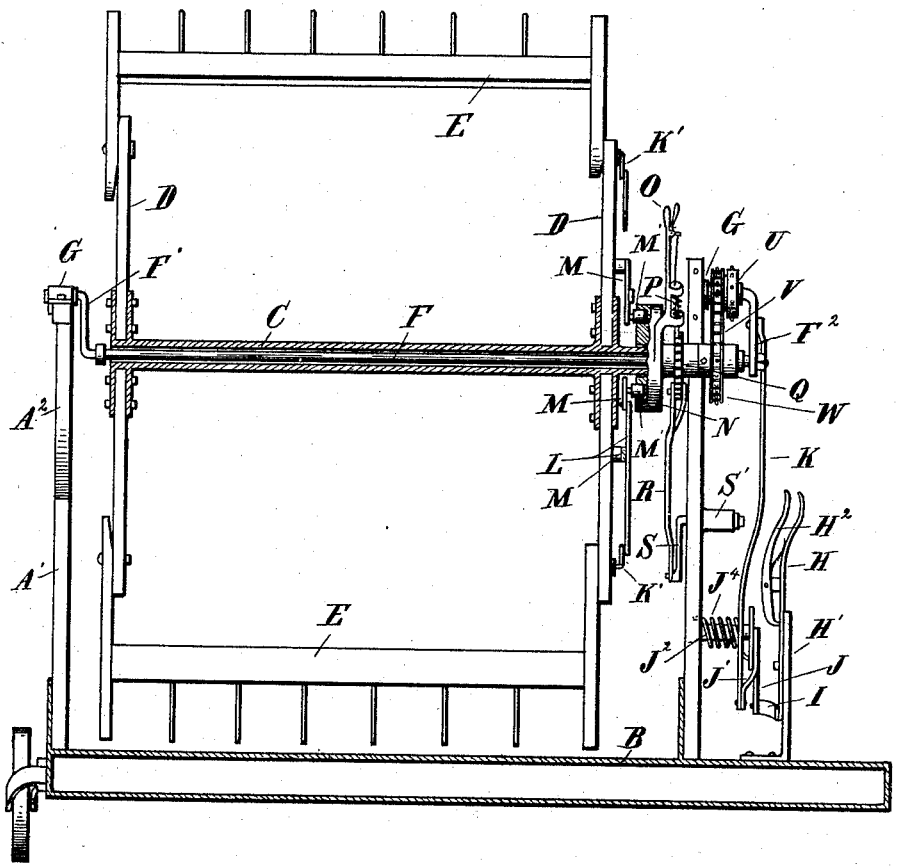

UNITED STATES PATENT OFFICE.

WALTER F. STIMPSON, OF MILAN, MICHIGAN.

MEANS FOR RAISING AND LOWERING HARVESTER-REELS.

SPECIFICATION forming part of Letters Patent No. 476,027, dated May 31, 1892.

Application filed July 1, 1891. Serial No. 398,190. (No model.)

*To all whom it may concern:*

Be it known that I, WALTER F. STIMPSON, a citizen of the United States, residing at Milan, in the county of Washtenaw and State of Michigan, have invented certain new and useful Improvements in Raising and Lowering Harvester-Reels, of which the following is a specification, reference being had therein to the accompanying drawings.

This invention specifically relates to means for raising and lowering the reel and in its combination with means provided for actuating the beaters of the reel, whereby the latter may be adjusted without having the adjustment disturbed by raising and lowering the reel, all as more fully hereinafter described.

In the accompanying drawings, which form a part of this specification, Figure 1 is a side elevation of my improved reel; and Fig. 2 is a front elevation thereof, partly in section. Fig. 3 is a detached elevation of the reverse side of the actuating-cam of the beaters and its means of adjustment.

A and A' are the two uprights which support the reel in the usual position above the harvester-platform B, the one supporting the outer end of the reel being placed near the outside rear corner and provided with a forwardly-projecting arm $A^2$, suitably held in position by the upright. The reel has a hollow shaft C, to which two sets of arms D are radially secured in any suitable manner, and to the outer ends of these arms are pivotally secured the beaters E. This reel is supported in position free to be raised and lowered by means of a shaft F, which passes loosely through the hollow reel-shaft, and the ends of which are provided or formed with cranks F' $F^2$, the drawings showing one of the cranks F' integrally formed with the shaft F and the other crank $F^2$ detachably secured thereto, whereby the reel may be readily mounted and dismounted. The cranks F' $F^2$ are pivotally secured, preferably, by forming pivot-pins thereon, which are journaled in bearings G, respectively secured to the upright A and the overhanging arm $A^2$ of the upright A'. The shaft F is adjustably held in position by the raising and lowering device, which consists of a lever H, secured to the frame in suitable proximity to the seat of the driver and having the usual notched or perforated segments H', with which the lever adjustably engages by means of a suitable spring-latch $H^2$. The lever is pivotally connected by means of the link or connecting-bar I with one arm J of a bell-crank lever, the other arm J' of which is pivotally connected by means of a connecting-link K with the crank $F^2$, all so arranged that by moving the lever H in one direction the driver can raise the reel, and by moving it in the opposite direction the reel will be correspondingly lowered to any desired degree.

To counterbalance the weight of the reel, the bell-crank works on the end of a short shaft $J^2$, the other end of which is journaled in a bearing $J^3$ on the upright A, and a coil-spring $J^4$ is sleeved upon the shaft $J^2$ and secured at one end to the bell-crank, all so arranged and adjusted that the tension of the coil-spring will more or less counterbalance the weight of the reel, and thus make the work of raising and lowering the reel comparatively easy for the driver.

Each beater is provided with means for actuating it, which consists of a crank K', formed on one of the two pivots of the beater, and which is pivotally connected by a link L with a short lever M, pivotally connected to the side of the reel, and provided with a roller M' on its free end. These rollers M' all travel in a cam-groove formed on the stationary cam N, which cam-groove is partly concentric and partly eccentric, as shown, whereby the eccentric portion normally holds each beater radially in line with the arms of the reel when approaching the platform, while the concentric portion causes each beater to rock on its pivots in the well-known manner to clear it more readily from the grain while receding from the platform. The cam N is sleeved upon the hollow shaft of the reel and has a hand-lever O secured to it. The hand-lever has the usual spring-latch P, which is adapted to engage into the notches of the segment Q, which latter is also sleeved upon the reel-shaft and is held in position thereon by being connected on opposite sides of the shaft to the forked ends of a connecting-bar R. The lower end of the forked bar is pivotally connected to a crank S, which is parallel with and equal to the crank $F^6$, and turns on a pivot-pin journaled in a box S' on the upright A. By the last-described arrangement of parts it will be seen that the cam N may be adjusted upon the reel-shaft to impart the tilting motion to the beaters at any desired position of the reel-arms. The raising or lowering of the reel, however, cannot effect the relative position of the notched segment Q on the reel-shaft, and consequently the cam, which is held in its adjusted position by the engagement of the lever O with the notched segment, will likewise maintain its adjusted position, and thus the adjustment of the beaters is not disturbed by the raising or lowering of the reel.

Motion is communicated from any suitable part of the operating mechanism of the harvester to one of the two sprocket-wheels U, sleeved upon pivot-pin of the crank F, and from there to the reel by a sprocket-chain V, passing around the other sprocket-wheel U and the sprocket-wheel W, which is secured upon the inner end of the hollow reel-shaft.

My construction has the advantage of simplicity, it gives easy and perfect control over the reel to the driver at all times, and provides a good support to the reel without interfering with the work of the harvester.

I do not claim as new for itself the device for imparting the tilting motion to the beaters, as this has been used heretofore; but

What I claim as my invention is—

1. In a harvester-reel, the combination of two supports on opposite sides of the harvester-platform, two cranks pivotally secured thereto, a reel-supporting shaft uniting the ends of the two cranks, a reel having a hollow shaft sleeved upon said reel-supporting shaft, beaters pivotally secured to the arms of the reel, the grooved cam sleeved upon the hollow shaft of the reel, the rollers engaging into said grooved cam and having actuating connections with the beater, the adjusting hand-lever of the cam provided with a spring-latch, and a notched segment sleeved upon the hollow shaft of the reel, the bifurcated connecting-rod and crank arranged to hold said notched segment in its relative position upon the hollow reel-shaft, and a raising and lowering device for adjusting the reel-supporting shaft in the arc of a circle, substantially as described.

2. In a harvester-reel, the combination of the upright A, the upright A', having the forwardly-projecting arm $A^2$, the bearing G on the upright A and arm $A^2$, the cranks F' and $F^2$, pivotally journaled in said bearings, the shaft F, uniting the ends of these cranks, the reel provided with the hollow shaft C, sleeved upon the shaft F, the hand-lever H, the segment H', the bell-crank lever J J', the connecting-bars I and K, pivotally connecting the arms of the bell-crank lever with the hand-lever H and crank $F^2$, respectively, and the coil-spring $J^4$, arranged to counterbalance the reel, all arranged to operate substantially as described.

In testimony whereof I affix my signature in presence of two witnesses.

WALTER F. STIMPSON.

Witnesses:
M. B. O'DOGHERTY,
N. L. LINDOP.